United States Patent [19]

Ponomarev et al.

[11] 4,075,170
[45] Feb. 21, 1978

[54] FLUOROSILOXANE RUBBERS AND PROCESS FOR PRODUCING SAME

[76] Inventors: Alexei Ivanovich Ponomarev, prospekt Stachek, 59, korpus 2, kv. 47; Julia Alexeevna Larionova, prospekt Elizarova, 12, kv. 15; Anatoly Kirillovich Ankudinov, ulitsa Lensoveta, 10, kv. 203; Rufina Mikhailovna Ryazanova, Vitebsky prospekt, 81, korpus 1, kv. 6; Alexandr Leibovich Klebansky, ulitsa Zhelyabova, 10, kv. 107; Sergei Vasilievich Sokolov, ulitsa III Internatsionala, 67, kv. 222, all of Leningrad; Vsevolod Volfovich Berenblit, Vsevolozhsky raion, poselok Kuzmolovsky, ulitsa Nagornaya, 23, kv. 10; Jury Pavlovich Dolnakov, Krasnoe selo, ulitsa Narvskaya, 4, kv. 122, both of Leningradskaya oblast; Tatyana Ivanovna Rymareva, Bulvar Novatorov, 14, kv. 16, Leningrad; Lev Moiseevich Yagupolsky, ulitsa Ivana Kudri, 41, kv. 48, Kiev; Vladlen Vasilievich Malovik, ulitsa Osipovskogo, 4/5, kv. 6, Kiev; Miron Onufrievich Lozinsky, ulitsa Voroshilova, 18, kv. 13, Kiev; Viktor Mikhailovich Belous, ulitsa Ujutnaya, 5-a, kv. 3, Odessa; Boris Efimovich Gruz, ulitsa Kurskaya, 10-a, kv. 18, Kiev; Ljubov Antonovna Alexeeva, Proletarsky bulvar, 41, kv. 28, Odessa; Alexandr Vasilievich Karlin, ulitsa Oboronnaya, 14, kv. 31; Vasily Danilovich Lobkov, Krasnoputilovskaya ulitsa, 109, kv. 23, both of Leningrad, all of U.S.S.R.

[21] Appl. No.: 713,969

[22] Filed: Aug. 12, 1976

[51] Int. Cl.² .................................................. C08G 77/04
[52] U.S. Cl. ............................ 260/46.5 G; 260/46.5 R; 260/46.5 Y; 260/46.5 UA
[58] Field of Search .................. 260/46.5 G, 46.5 R, 260/46.5 Y, 46.5 UA

[56] References Cited

U.S. PATENT DOCUMENTS 3,280,071  10/1966  Beck ................... 260/46.5 G
3,729,445  4/1973   Smith et al. ......... 260/46.5 G Primary Examiner—Melvyn I. Marquis
Attorney, Agent, or Firm—Haseltine, Lake & Waters

[57] ABSTRACT

The present invention relates to fluorosiloxane rubbers of the formula:

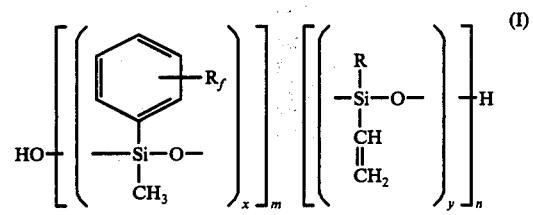

wherein:
$R_F$ = $OCF_3$, $OC_2F_5$, $OC_2F_4OCF_3$, $C_2F_4OCF_3$, $C_3F_7$,
$R$ = $CH_3$, $C_6H_5$,
$x = 1.0 - 0.97$,
$y = 0 - 0.03$,
$m = 370.9 - 1,863.4$,
$n = 0 - 44.5$ having an average molecular weight within the range of from 98,000 to 410,250. The present invention also relates to a process for producing said fluorosiloxane rubbers. The process comprises polycondensation of fluorosiloxane-diols of the formula:

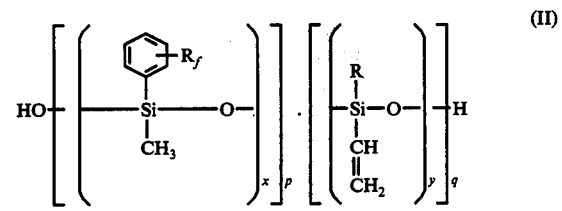

wherein:
$R_F$ = $OCF_3$, $OC_2F_5$, $OC_2F_4OCF_3$, $C_2F_4OCF_3$, $C_3H_7$,
$R$ = $CH_3$, $C_6H_5$,
$x = 1.0 - 0.97$,
$y = 0 - 0.03$,
$p = 2.3 - 187.2$,
$q = 0 - 3.8$ having an average molecular weight within the range of from 620 to 51,200 at a temperature of from 80° to 150° C in the presence of a basic catalyst or a catalyst comprising a complex salt of trifluoroacetic acid and piperidine. The fluorosiloxane rubbers according to the present invention possess a high heat-resistance, frost-resistance, gasoline- and oil-resistance. They are useful in different branches of industry such as instrument production, automobile industry, aviation engineering and the like. The process according to the present invention makes it possible to produce the desired products with a high yield (up to 98% of the theoretical value).

3 Claims, No Drawings

FLUOROSILOXANE RUBBERS AND PROCESS FOR PRODUCING SAME

The present invention relates to novel compounds, viz. fluorosiloxane rubbers and to a process for producing same.

In accordance with the present invention, said fluorosiloxane rubbers comprise compounds of the formula:

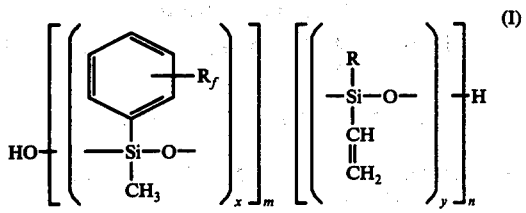

wherein:
$R_F = OCF_3, OC_2F_5, OC_2F_4OCF_3, C_2F_4OCF_3, C_3F_7$
$R = CH_3, C_6H_5$
$x = 1.0 - 0.97$,
$y = 0 - 0.03$,
$m = 370.9 - 1,863.4$,
$n = 0 - 44.5$ and have an average molecular weight within the range of from 98,000 to 410,250.

Said fluorosiloxane rubbers possess a high heat-resistance (up to 370° - 415° C according to the data of thermodifferential analysis), frost-resistance (glass-transition temperature is as low as (−65)° to (−71)° C); gasoline- and oil-resistance (the rubbers are insoluble in hexane, gasoline, benzene, toluene and other non-polar solvents as well as in acetone and mineral oils). These rubbers are useful in various industries such as aviation engineering, automobile industry production of instruments and the like.

The fluorosiloxane rubbers according to the present invention may be produced by a process which, in accordance with the present invention, comprises polycondensation of fluorosiloxane-diols of the formula:

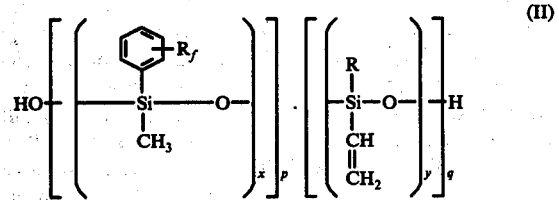

wherein:
$R_F = OCF_3, OC_2F_5, OC_2F_4OCF_3, C_2F_4OCF_3, C_3F_7$,
$R = CH_3, C_6H_5$,
$x = 1.0 - 0.97$,
$y = 0 - 0.03$,
$p = 2.3 - 187.2$,
$q = 0 - 3.8$ and having an average molecular weight of from 620 to 51,200 at a temperature of from 80 to 150° C in the presence of a basic catalyst or a catalyst comprising a complex salt of trifluoroacetic acid and piperidine.

The process according to the present invention makes it possible to obtain the desired products at a high yield (up to 98% of the theoretical value).

To accelerate the polycondensation process, it is advisable that it be performed under vacuum at a residual pressure of from 2 to 10 mm Hg.

The process for producing fluorosiloxane rubbers of formula (I) according to the present invention is effected in the following manner.

The starting fluorosiloxane-diols of formula (II) and a calculated amount of a basic catalyst or a catalyst comprising a complex salt of trifluoroacetic acid and pyridine are charged into a reactor. As the basic catalyst use may be made, for example, of lithium hydroxide, sodium hydroxide, potassium hydroxide, poly-[methyl-(3,3,3-trifluoropropyl)siloxane]-α,ω-diolate of sodium. The process of polycondensation of fluorosiloxane-diols is conducted at room temperature under atmospheric pressure or vacuum (residual pressure of from 2 to 10 mm Hg) under vigorous stirring. When conducted under vacuum, the polycondensation process is accelerated due to a more rapid removal of easily-volatile by-products from the reaction zone. This polycondensation process results in a fluorosiloxane rubber of a predetermined molecular weight. The subsequent purification and recovery of the fluorosiloxane rubber is performed by conventional techniques. Thus, the rubber is dissolved in an organic solvent such as toluene, hexafluorobenzene and then is coagulated by means of ethanol. Then ethanol and easily-volatile by-products are removed from the rubber by distillation in vacuum. When the basic catalyst is employed in the polycondensation process it is neutralized by way of adding trifluoroacetic acid into the solution of fluorosiloxane rubber (prior to coagulation thereof).

For a better understanding of the present invention, the following Example illustrating its specific embodiments are given hereinbelow (coefficients "m", "n", "p", "q" corresponding to formulae (I) and (II) as well as molecular weights of the compounds described by formulae (I) and (II) are shown in the Examples as their average quantitative values).

EXAMPLE 1

Fluorosiloxane rubber is prepared by polycondensation of poly-{[(meta-trifluoromethoxy)phenyl]methylsiloxane}-α,ω-diols of formula (II), wherein $R_f = OCF_3; x = 1.0; y = 0; p = 140.5; q = 0$; average molecular weight is 31,020. To this end, charged into a reactor are 194.4 g of poly-{[(meta-trifluoromethoxy)phenyl]-methylsiloxane}-α,ω-diols. The reactor content is heated to 80° C and at this temperature with vigorous stirring 1.94 g of a complex salt of trifluoroacetic acid and piperidine preliminary dissolved in 6 ml of toluene are added to the poly-{[(meta-trifluoromethoxy)-phenyl]methylsiloxane}-α,ω-diols; the amount of said complex salt constituting 1% by weight of the diols. Then, the reaction temperature is elevated to 100° C and the reactor contents is maintained at this temperature for 45 hours under vigorous stirring. On expiration of said period the polycondensation process is completed to give fluorosiloxane rubber of a predetermined molecular weight. Then the fluorosiloxane rubber is dissolved in toluene and coagulated by means of ethanol (to wash-off the catalyst) and maintained under vacuum (2 mm Hg) at a temperature of from 150° to 160° C for 3 hours (to remove the ethanol and easily-volatile products). As a result, 182.3 g (94% of the theoretical yield) of fluorosiloxane rubber of formula (I), wherein $R_f = OCF_3; x = 1.0; y = 0; m = 1,136.3; n = 0$ and molecular weight is 250,000 (intrinsic viscosity in toluene at 20° C is 1.2) are obtained.

Elemental analysis:

Found, %: C 43.71; H 3.08; Si 12.81; F 25.62

$$HO\{(C_8H_7SiO_2F_3)_{1.0}\}^H 1,136.3$$

Calculated, %: C 43.63; H 3.18; Si 12.72; F 25.90.

The thus-produced fluorosiloxane rubber has the following properties:
1) It is insoluble in gasoline, hexane, mineral oils;
2) well-soluble in ethylacetate; diethyl ether, toluene;
3) glass-transition temperature is −72° C;
4) starting point of oxidation in the air atmosphere, as measured by the thermal differential analysis method (TDA) is 415° C;
5) starting point of decomposition in vacuum ($2 \cdot 10^{-3}$ mm Hg) as measured by the thermal gravimetric analysis method (TGA) is 415° C.

Weight increase of vulcanizate samples produced from this fluorosiloxane rubber is 25% after maintaining the samples in gasoline at 20° C for three days; weight increase of the samples after maintaining thereof in motor oil at 130° C for three days is 8%.

EXAMPLE 2

Fluorosiloxane rubber is prepared by polycondensation of poly{[(meta-trifluoromethoxy)phenyl]methylsiloxane}-α,ω-diols of formula (II), wherein $R_f$ = $OCF_3$; R = $CH_3$; x = 0.97; y = 0.03; p = 20.3; q = 0.6, with an average molecular weight of 4,520. To this end, 198 g of poly-{[(meta-trifluoromethoxyphenyl]methylsiloxane}-α,ω-diols are charged into a reactor. The reactor contents is heated to 80° C and at this temperature 3.9 g (2% by weight of the diols) of a complex salt of trifluoroacetic acid and piperidine preliminary dissolved in 12 ml of toluene are added to the poly{[(meta-trifluoromethoxy)phenyl]methylsiloxane}-α,ω-diols under vigorous stirring. Thereafter, vacuum is created in the reactor (2-4 mm Hg) and the temperature is elevated to 100° - 110° C.

Under said conditions and vigorous stirring the reactor contents is maintained for 24 hours. On expiration of this period the process of polycondensation is completed to give a fluorosiloxane rubber of a predetermined molecular weight. Further treatment of the rubber is performed in the manner described in the foregoing Example 1 to yield 172.2 g (87% of the theoretical yield) of a fluorosiloxane rubber of formula (I), wherein $R_f$ = $OCF_3$; R = $CH_3$; x = 0.97; y = 0.03; m = 1.439.3; n = 44.5 with an average molecular weight of 320,500 (intrinsic viscosity in toluene at 20° C is equal to 1.4).

Elemental analysis:

Found, %: C 43.72; H 3.42; Si 13.12; F 25.71; $CH_2$=CH 0.12.

$$HO\{(C_8H_7SiO_2F_3)_{0.97}\}1,439.3 \cdot [(C_3H_6SiO)_{0.03}\}^H 44.5$$

Calculated, %: C 43.61; H 3.22; Si 13.00; F 25.60; $CH_2$=CH 0.12.

The resulting fluorosiloxane rubber possesses properties similar to those described in Example 1.

EXAMPLE 3

In accordance with the procedure described in Example 2 from 190 g of poly-{[(para-trifluoromethoxy)phenyl]methylsiloxane}-α,ω-diols of formula (II), wherein $R_f$ = $OCF_3$; R = $CH_3$, x = 0.997; y = 0.003; p = 9.97; q = 0.03 having an average molecular weight of 2,190 in the presence of 3.8 g (2% by weight of the diols) of a complex salt of trifluoroacetic acid and piperidine after polycondensation for 35 hours 155.8 g (82% of the theoretical yield) of a fluorosiloxane rubber of formula (I) are obtained, wherein $R_f$ = $OCF_3$; R = $CH_3$; x = 0.997; y = 0.003; m = 1,863.4; n = 5.6 with an average molecular weight of 410,520 (intrinsic viscosity in toluene at 20° C is 2.1).

Elemental Analysis

Found, %: C 43.75; H 3.24; Si 12.61; F 26.10; $CH_2$=CH 0.03.

$$HO\{(C_8H_7SiO_2F_3)_{0.997}\}1,863.4 \cdot [(C_3H_6SiO)_{0.003}\}^H 5.6$$

Calculated, %: C 43.63; H 3.18; Sl 12.70; F 25.90; $CH_2$=CH 0.03.

The resulting fluorosiloxane rubber possesses the following properties:
1) it is insoluble in gasoline, hexane, mineral oils;
2) well-soluble in ethylacetate, hexafluorobenzene, toluene;
3) glass-transition temperature is −49° C;
4) starting temperature of oxidation in the air atmosphere as measured by the TDA method is 390° C;
5) starting temperature of decomposition in vacuum ($2 \cdot 10^{-3}$ mm Hg) as measured by the TGA method is 395° C.

Weight increase of vulcanizate samples prepared from said fluorosiloxane rubber, after maintaining these samples in gasoline at the temperature of 20° C for 3 days, is 23%, while after maintaining them in motor oil at the temperature of 130° C for 3 days a weight increase is 5.6%.

EXAMPLE 4

A fluorosiloxane rubber is produced by polycondensation of poly-{[(ortho-trifluoromethoxy)phenyl]methylsiloxane}-α,ω-diols of formula (II), wherein $R_f$ = $OCF_3$; x = 1.0; y = 0; p = 4.0; q = 0 with an average molecular weight of 882. To this end, charged into a reactor are 135 g of poly-{[(ortho-trifluoromethoxy)phenyl]methylsiloxane}-α,ω-diols. The reactor contents is heated to the temperature of 120° C and 0.027 g (0.02% by weight of the diols) of lithium hydroxide is added to the poly-{[(ortho-trifluoromethoxy)phenyl]methylsiloxane}-α,ω-diols under vigorous stirring at the same temperature. Thereafter, vacuum is created in the reactor (4 mm Hg) and the temperature is elevated to 150° C. Under these conditions and with vigorous stirring the reactor contents is maintained for 18 hours. The resulting fluorosiloxane rubber of a predetermined molecular weight is dissolved in toluene and to neutralize the catalyst (lithium oxide) 0.12 g of trifluoroacetic acid is added to the rubber solution. Further treatment is conducted as in the foregoing Example 1. As a result, 113.4 g (84% of the theoretical yield) of fluorosiloxane rubber of formula (I), wherein $R_f$ = $OCF_3$; x = 1.0; y = 0; m = 683.9; n = 0, with an average molecular weight of 150, 450 (intrinsic viscosity in toluene at 20° C is equal to 1.07).

Elemental Analysis

Found, %: C 43.81; H 3.24; Si 12.65; F 25.72.

$$HO\{(C_8H_7SiO_2F_7)_{1.0}\}^H 683.9$$

Calculated, %: C 43.63; H 3.18; Si 12.72; F 25.90.

The resulting fluorosiloxane rubber possesses the following properties:
(1) it is insoluble in gasoline, hexane, mineral oils;
(2) it is well-soluble in ethylacetate, diethyl ether, hexafluorobenzene;
(3) starting temperature of oxidation in the air atmosphere as measured by the TDA method is 375° C;
(4) glass-transition temperature is (−45° C).

EXAMPLE 5

In accordance with the procedure described in Example 1 hereinabove, polycondensation of poly-{[(meta-pentafluoroethoxy)phenyl]methylsiloxane}-$\alpha,\omega$-diols of the formula (II) wherein $R_f = OC_2F_5$; $R = C_6H_5$; $x = 0.98$; $y = 0.02$; $p = 187.2$; $q = 3.8$, with an average molecular weight of 51,200 and taken in the amount of 300 g is conducted in the presence of 0.06 g (0.02% by weight of the diols) of sodium hydroxide for 15 hours. Further operations of purification and recovery of the resulting fluorosiloxane rubber is performed in a manner similar to that described in the foregoing Example 4 to give 295 g (98.3% of the theoretical yield) of fluorosiloxane rubber of the formula (I), wherein $R_f = OC_2F_5$; $R = C_6H_5$; $x = 0.98$; $y = 0.02$; $m = 370.9$; $n = 7.6$ with an average molecular weight of 101,250 (intrinsic viscosity in hexafluorobenzene at 20° C is 0.77).

Elemental analysis

Found, %: C 40.46; Si 10.51; F 35.44; $CH_2=CH$ 0.22.

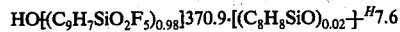

Calculated, %: C 40.37; Si 10.49; F 35.20 $CH_2=CH$ 0.22.

The resulting fluorosiloxane rubber features the following properties:
1) It is insoluble in gasoline, benzene, acetone, hexane, toluene, mineral oils;
2) it is well-soluble in ethylacetate, hexafluorobenzene, hexafluoroxylene;
3) glass-transition temperature is −48° C;
4) starting temperature of oxidation in the air atmosphere is 368° C as measured by the TDA method;
5) starting point of decomposition in vacuum ($2 \cdot 10^{-3}$ mm Hg) as measured by the TGA method is 370° C.

EXAMPLE 6

A fluorosiloxane rubber is prepared by polycondensation of poly-{[(para-pentafluoroethoxy)phenyl]methylsiloxane}-$\alpha,\omega$-diols of formula (II), wherein $R_f = OC_2F_5$; $x = 1.0$; $y = 0$; $p = 2.3$; $q = 0$, with an average molecular weight of 620. To this end, charged into a reactor are 50 g of poly-{[(para-pentafluoroethoxy)phenyl]methylsiloxane}-$\alpha,\omega$-diols. The reactor contents is heated to the temperature of 120° C and at this temperature and under vigorous stirring said poly-{[(para-pentafluoroethoxy)phenyl]methylsiloxane}-$\alpha,\omega$-diols are added with sodium poly-[methyl-(3,3,3-trifluoropropyl)siloxane]-$\alpha,\omega$-diolate in the amount of 0.04 g (0.01% of sodium hydroxide by weight of the diols). Thereafter, vacuum is created in the reactor (5–6 mm Hg) and temperature is elevated to 140° − 150° C. Under said conditions and with constant vigorous stirring, the reactor contents is maintained for 4.5 hours. On termination of this period, the polycondensation process is completed to give a fluorosiloxane rubber of a predetermined molecular weight. Further treatment of the rubber is performed in accordance with the procedure described in the foregoing Example 4. As a result, 47 g (94% of the theoretical yield) of fluorosiloxane rubber are obtained which corresponds to formula (I), wherein $R_f = OC_2F_5$; $x = 1.0$; $y = 0$; $m = 363$; $n = 0$, with an average molecular weight of 98,000 (intrinsic viscosity in hexafluorobenzene at 20° C is equal to 0.74).

Elemental Analysis

Found, %: C 40.21; Si 10.53; F 35.36.

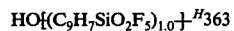

Calculated, %: C 40.0; Si 10.37; F 35.19.

The resulting fluorosiloxane rubber possesses the following properties:
1) It is insoluble in gasoline, benzene, hexane, toluene, mineral oils;
2) it is well-soluble in ethylacetate, benzotrifluoride, hexafluoroxylene;
3) glass-transition temperature is −22° C;
4) starting temperature of oxidation in the air atmosphere, as measured by the TDA method, is 360° C;
5) starting point of decomposition in vacuum ($2 \cdot 10^{-3}$ mm Hg) as measured by the TGA method, is 362° C.

Weight increase of vulcanizate samples prepared from the thus-obtained fluorosiloxane rubber, after maintaining them at 20° C in gasoline for 3 days is 15%; weight increase of vulcanizate samples maintained in motor oil at 130° C for 3 days is 3.6%.

EXAMPLE 7

Charged into a reactor are 150 g of poly-{[(meta-perfluoro-1,4-dioxaamyl)phenyl]methylsiloxane}-$\alpha,\omega$-diols of formula (II), wherein $R_f = OC_2F_4OCF_3$; $R = C_6H_5$; $x = 0.99$; $y = 0.01$; $p = 29.9$; $q = 0.3$, with an average molecular weight of 10,100. Polycondensation is conducted in the presence of 0.057 g of potassium poly-[(methyl-(3,3,3-trifluoropropyl)-siloxane]-$\alpha,\omega$-diolate (0.005% of potassium hydroxide by weight of the diols) at a temperature within the range of from 140° to 150° C under vacuum (residual pressure of 8 - 10 mm Hg) under vigorous stirring for 20 hours. Further operations of purification and recovery of the resulting fluorosiloxane rubber are similar to those described in the foregoing Example 4. As a result, 144 g (96% of the theoretical yield) of a fluorosiloxane are obtained having structure corresponding to formula (I), wherein $R_f = OC_2F_4OCF_3$; $R = C_6H_5$; $x = 0.99$; $y = 0.01$; $m = 714.8$; $n = 7.2$, with an average molecular weight of 240,450 (intrinsic viscosity in hexafluorobenzene at 20° C is 1.17).

Elemental Analysis

Found, %: C 36.21; Si 8.45; F 40.02; $CH_2=CH$ 0.09.

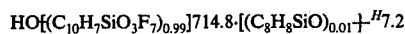

Calculated, %: C 35.93; Si 8.36; F 39.82; $CH_2=CH$ 0.08.

The thus-prepared fluorosiloxane rubber possesses the following properties:
1) It is insoluble in benzene, hexane, toluene, gasoline, acetone, mineral oils;

2) it is well-soluble in ethylacetate, diethyl ether, hexafluorobenzene, hexafluoroxylene;
3) its glass-transition temperature is −68° C;
4) starting temperature of oxidation in the air atmosphere, as measured by the TDA method, is 400° C;
5) starting temperature of decomposition in vacuum ($2\cdot 10^{-3}$ mm Hg), as measured by the TGA method, is 385° C.

Weight increase of vulcanizate samples produced from the thus-obtained fluorosiloxane rubber is 12% after maintaining these samples at the temperature of 20° C in gasoline for 3 days; weight increase of these samples maintained in motor oil at the temperature of 130° C for 3 days is 2.7%.

EXAMPLE 8

In accordance with the procedure described in the foregoing Example 7, from 70 g of poly-{[(meta-perfluoro-1,4-dioxaamyl)phenyl]methylsiloxane}-α,ω-diols of formula (II), wherein $R_f = OC_2F_4OCF_3$; $x = 1.0$; $y = 0$; $p = 3.5$; $q = 0$, with an average molecular weight of 1,080 in the presence of 0.09 g of lithium poly-[methyl-(3,3,3-trifluoropropyl)siloxane]-α,ω-diolate (0.01% of lithium hydroxide by weight of the diols) after polycondensation during 22 hours 63 g (90% of the theoretical yield) of a fluorosiloxane rubber having formula (I) are obtained, wherein $R_f = OC_2F_4OCF_3$; $x = 1.0$; $y = 0$; $m = 775.4$; $n = 0$, with an average molecular weight of 260,540 (intrinsic viscosity in hexafluorobenzene at the temperature of 20° C is equal to 1.23).

Elemental Analysis

Found, %: C 35.84; Si 8.45; F 39.63.

Calculated, %: C 35.71; Si 8.33; F 39.55.

The resulting fluorosiloxane rubber features the properties similar to those described in the foregoing Example 7.

EXAMPLE 9

Charged into a reactor are 100 g of poly-{[(meta-perfluoro-3-oxabutyl)phenyl]methylsiloxane}-α,ω-diols of the formula (II), wherein $R_f = C_2F_4OCF_3$; $x = 1.0$; $y = 0$; $p = 32$; $q = 0$, with an average molecular weight of 10,250. Polycondensation is carried out in the presence of 0.08 g of sodium poly-[methyl-(3,3,3-trifluoropropyl)siloxane]-α,ω-diolate (0.01% of sodium hydroxide by weight of the diols) at a temperature of 140°–150° C in vacuo (residual pressure being 2–3 mm Hg) under vigorous stirring for 18 hours. Further operations of purification and recovery of the fluorosiloxane rubber thus obtained are similar to those described in Example 4 hereinabove. As a result, 95.5 g (95.5% of the theoretical yield) of fluorosiloxane rubber corresponding to formula (I) are obtained, wherein $R_4 = C_2F_4OCF_3$; $x = 1.0$; $y = 0$; $m = 969.5$; $n = 0$, with an average molecular weight of 310,240 (intrinsic viscosity in hexafluorobenzene at 20° C is equal to 1.31).

Elemental Analysis

Found, %: C 37.72; Si 8.92; F 41.31.

Calculated, %: C 37.5; Si 8.75; F 41.25.

The resulting fluorosiloxane rubber possesses the following properties:
1) It is insoluble in benzene, toluene, gasoline, hexane, acetone, mineral oils;
2) it is well-soluble in ethylacetate, diethyl ether, hexafluorobenzene, hexafluoroxylene;
3) its glass-transition temperature is −68° C;
4) starting temperature of oxidation in the air atmosphere, as measured by the TDA method, is 405° C;
5) starting point of decomposition in vacuum ($2\cdot 10^{-3}$ mm Hg), as measured by the TGA method, is 407° C;

EXAMPLE 10

Charged into a reactor are 75 g of poly-{[(meta-heptafluoropropyl)phenyl]methylsiloxane}-α,ω-diols of formula (II), wherein $R_f = C_3F_7$; $x = 1.0$; $y = 0$; $p = 60.8$; $q = 0$, with an average molecular weight of 18,500. Polycondensation is conducted in the presence of 0.01 g (0.015% by weight of the diols) of sodium hydroxide at a temperature within the range of from 140° to 150° C under vigorous stirring for 32 hours. Further operations of purification and recovery of the resulting fluorosiloxane rubber are similar to those described in Example 4 hereinabove. As a result, 64.5 g (86% of the theoretical yield) of fluorosiloxane rubber of formula (I) are obtained, wherein $R_f = C_3F_7$; $x = 1.0$; $y = 0$; $m = 600$; $n = 0$, with an average molecular weight of 182,400 (intrinsic viscosity in hexafluorobenzene at the temperature of 20° C is 1.12).

Elemental Analysis

Found, %: C 39.61; Si 9.35; F 43.91.

Calculated, %: C 39.47; Si 9.21; F 43.75.

The thus-prepared fluorosiloxane rubber has the following properties:
1) it is insoluble in gasoline, hexane, benzene, toluene, acetone, mineral oils;
2) well-soluble in ethylacetate, diethyl ether, hexafluorobenzene, hexafluoroxylene;
3) its glass-transition temperature is −44° C;
4) starting temperature of oxidation in the air atmosphere, as measured by the TDA method, is 370° C;
5) starting temperature of decomposition in vacuum ($2\cdot 10^{-3}$ mm Hg) is 390° C as measured by the TGA method.

EXAMPLE 11

Charged into a reactor are 100 g of poly-{[(meta-trifluoromethoxy)phenyl]methylsiloxane}-α,ω-diols of formula (II), wherein $R_f = OCF_3$; $R = C_6H_5$; $x = 0.998$; $y = 0.002$; $p = 27.94$; $q = 0.06$, with an average molecular weight of 6.200. Polycondensation is conducted in the presence of 0.078 g of poly-[methyl-(3,3,3-trifluoropropyl)siloxane]-α,ω-diolate of sodium (0.01% of sodium hydroxide by weight of the diols) at a temperature within the range of from 140° to 150° C in vacuum (residual pressure of 6–7 mm Hg) with vigorous stirring for 24 hours. Further operations of purification and recovery of the resulting fluorosiloxane rubber are similar to those described in the foregoing Example 4. As a result, 92.7 g (92.7% of the theoretical yield) of fluorosiloxane rubber corresponding to formula (I) are obtained, wherein $R_f = OCF_3$; $R = C_6H_5$; $x = 0.998$; $y = 0.002$; $m = 1,300.4$; $n = 2.6$, with an average molecular weight of 285,630 (intrinsic viscosity in toluene at the temperature of 20° C is 1.27).

Elemental Analysis

Found, %: C 43.32; Si 12.86; F 25.81; $CH_2=CH$ 0.025.

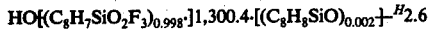

Calculated, %: C 43.24; Si 12.73; F 25.67; $CH_2=CH$ 0.024.

The resulting fluorosiloxane rubber possesses properties similar to those described in Example 2 hereinabove.

EXAMPLE 12

Charged into a reactor are 150 g of poly-{[(meta-pentafluoroethoxy)-phenyl]methylsiloxane}-$\alpha,\omega$-diols of formula (II), wherein $R_f = OC_2F_5$; $R = CH_3$; $x = 0.99$; $y = 0.01$; $p = 31.1$; $q = 0.3$, with an average molecular weight of 8,420. Polycondensation is conducted in the presence of 0.0114 g of poly-[methyl-(3,3,3-trifluoropropyl)siloxane]-$\alpha,\omega$-diolate of potassium (0.001% of potassium hydroxide by weight of the diols) at a temperature of from 140° to 150° C in vacuum (residual pressure of 2 mm Hg) under vigorous stirring for 8 hours. Further operations of purification and recovery of the resulting fluorosiloxane rubber are similar to those described in Example 4 hereinabove. As a result, 145.5 g (97% of the theoretical yield) of fluorosiloxane rubber of formula (I) are obtained, wherein $R_f = OC_2F_5$; $R = CH_3$; $x = 0.99$; $y = 0.01$; $m = 463.5$; $n = 4.7$, with an average molecular weight of 125,340 (characteristic viscosity in hexafluorobenzene at 20° C is equal to 0.86).

Elemental Analysis

Found, %: C 40.42; Si 10.62; F 35.25; $CH_2=CH$ 0.09.

Calculated, %: C 40.30; Si 10.49; F 35.16; $CH_2=CH$ 0.10.

The resulting fluorosiloxane rubber has the properties which are similar to those described in Example 5 hereinbefore.

EXAMPLE 13

Charged into a reactor are 120 g of poly-{[(meta-perfluoro-1,4-dioxaamyl)phenyl]methylsiloxane}-$\alpha,\omega$-diols of formula (II), wherein $R_f = OC_2F_4OCF_3$; $R = CH_3$; $x = 0.99$; $y = 0.01$; $p = 49.5$; $q = 0.5$, with an average molecular weight of 16,650. Polycondensation is conducted in the presence of 0.014 g of poly-[methyl-(3,3,3-trifluoropropyl)siloxane]-$\alpha,\omega$-diolate of sodium (0.015% of sodium hydroxide by weight of the diols) at a temperature within the range of from 130° to 140° C in vacuum (residual pressure of 2 mm Hg) under vigorous stirring for 23 hours. Further operations of purification and recovery of the resulting fluorosiloxane rubber are similar to those described in Example 4 hereinabove. As a result, 114.6 g (95.5% of the theoretical yield) of fluorosiloxane rubber of formula (I) are obtained, wherein $R_f = OC_2F_4OCF_3$; $R = CH_3$; $x = 0.99$; $y = 0.01$; $m = 703.5$; $n = 7.1$, with an average molecular weight of 252,640 (intrinsic viscosity in hexafluorobenzene at 20° C is 1.25).

Elemental Analysis

Found, %: C 35.86; Si 8.51; F 39.72; $CH_2=CH$ 0.08

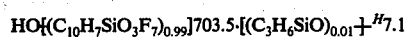

Calculated, %: C 35.71; Si 8.33; F 39.55; $CH_2=CH$ 0.08

The resulting fluorosiloxane rubber possesses the properties similar to those described in Example 7 hereinabove.

EXAMPLE 14

Charged into a reactor are 200 g of poly-{[(meta-perfluoro-3-oxabutyl)phenyl]methylsiloxane}-$\alpha,\omega$-diols of formula (II), wherein $R_f = C_2F_4OCF_3$; $R = CH_3$; $x = 0.98$; $y = 0.02$; $p = 68.6$; $q = 1.4$, with an average molecular weight of 22,050. Polycondensation is effected in the presence of 0.04 g (0.02% by weight of the diols) of sodium hydroxide at a temperature within the range of from 140°-150° C under vigorous stirring for 30 hours in vacuum (residual pressure of 4-5 mm Hg). Further operations of purification and recovery of the resulting fluorosiloxane rubber are similar to those described in Example 4 hereinbefore. As a result, 192 g (96% of the theoretical yield) of fluorosiloxane rubber corresponding to formula (I) are obtained, wherein $R_f = C_2F_4OCF_3$; $R = CH_3$; $x = 0.98$; $y = 0.02$; $m = 919.4$; $n = 18.7$, with an average molecular weight of 295,830 (intrinsic viscosity in hexafluorobenzene at the temperature of 20° C is equal to 1.36).

Elemental Analysis

Found, %: C 38.15; Si 9.02; F 42.31; $CH_2=CH$ 0.16.

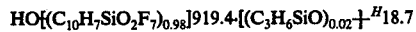

Calculated, %: C 38.09; Si 8.88; F 42.22; $CH_2=CH$ 0.17.

The resulting fluorosiloxane rubber has the properties similar to those described in Example 9 hereinbefore.

EXAMPLE 15

Into a reactor there are charged 100 g of poly-{[(meta-perfluoro-3-oxabutyl)phenyl]methylsiloxane}-$\alpha,\omega$-diols of formula (II), wherein $R_f = C_2F_4OCF_3$; $R = C_6H_5$; $x = 0.98$; $y = 0.02$; $p = 78.4$; $q = 1.6$, with an average molecular weight of 25,280. Polycondensation is conducted in the presence of 0.015 g (0.015% by weight of the diols) of potassium hydroxide at a temperature within the range of from 140° to 150° C in vacuum (residual pressure of 3 mm Hg) under vigorous stirring for 28 hours. Further operations of purification and recovery of the resulting fluorosiloxane rubber are similar to those described in Example 4 hereinabove. As a result, there are obtained 96.3 g (96.3% of the theoretical yield) of fluorosiloxane rubber of formula (I), wherein $R_f = C_2F_4OCF_3$; $R = C_6H_5$; $x = 0.98$; $y = 0.02$; $m = 843.2$; $n = 17.2$, with an average molecular weight of 27,320 (intrinsic viscosity in hexafluorobenzene at the temperature of 20° C is equal to 1.30).

Elemental Analysis

Found, %: C 38.17; Si 8.96; F 42.24; $CH_2=CH$ 0.16

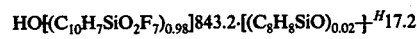

Calculated, %: C 38.00; Si 8.80; F 42.12; CH$_2$=CH 0.17.

The thus-prepared fluorosiloxane rubber possesses the properties similar to those described in Example 9 hereinabove.

EXAMPLE 16

Into a reactor there are charged 302 g of poly-{[(meta-hepta-fluoropropyl)phenyl]methylsiloxane}-α,ω-diols of formula (II), wherein R$_f$ = C$_3$F$_7$; R = C$_6$H$_5$; $x$ = 0.97; $y$ = 0.03; $p$ = 63; $q$ = 2, with an average molecular weight of 19,435. Polycondensation is conducted in the presence of 0.03 g (0.01% by weight of the diols) of lithium hydroxide at a temperature within the range of from 140° to 150° C in vacuum (residual pressure is of 2 mm Hg) under vigorous stirring for 24 hours. Further operations of purification and recovery of the resulting fluorosiloxane rubber are performed in the manner similar to that described in the foregoing Example 4 to give 283.9 g (94% of the theoretical yield) of fluorosiloxane rubber of formula (I), wherein R$_f$ = C$_2$F$_4$OCF$_3$; R = C$_6$H$_5$; $x$ = 0.97; $y$ = 0.03; $m$ = 779.9; $n$ = 24.1, with an average molecular weight of 240,620 (intrinsic viscosity in hexafluorobenzene at the temperature of 20° C is 1.40).

Elemental Analysis

Found, %: C 40.18; Si 9.52; F 44.62; CH$_2$=CH 0.26.

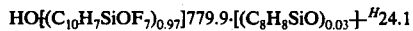

HO{(C$_{10}$H$_7$SiOF$_7$)$_{0.97}$]779.9·[(C$_8$H$_8$SiO)$_{0.03}$}$^H$24.1

Calculated, %: C 40.14; Si 9.37; F 44.48; CH$_2$=CH 0.27.

The thus-prepared fluorosiloxane rubber has the properties similar to those described in Example 10 hereinbefore.

EXAMPLE 17

Charged into a reactor are 200 g of poly-{[(meta-heptafluoropropyl)phenyl]methylsiloxane}-α,ω-diols of formula (II), wherein R$_f$ = C$_3$F$_7$; R = CH$_3$; $x$ = 0.998; $y$ = 0.002; $p$ = 35.9; $q$ = 0.1, with an average molecular weight of 10,920. Polycondensation is conducted in the presence of 0.04 g (0.02% by weight of the diols) of sodium hydroxide at a temperature within the range of from 140° to 150° C in vacuum (residual pressure is of 8 mm Hg) under vigorous stirring for 20 hours. Further operations of purification and recovery of the resulting fluorosiloxane rubber are performed in the manner similar to that described in Example 4 hereinbefore. As a result, there are obtained 190 g (95% of the theoretical yield) of fluorosiloxane rubber corresponding to formula (I), wherein R$_f$ = C$_3$F$_7$; R = CH$_3$; $x$ = 0.998; $y$ = 0.002; $m$ = 828.1; $n$ = 1.6 with an average molecular weight of 251,820 (intrinsic viscosity in hexafluorobenzene at the temperature of 20° C is equal to 1.52).

Elemental Analysis

Found, %: C 39.72; Si 9.36; F 43.95; CH$_2$=CH 0.06.

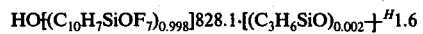

HO{(C$_{10}$H$_7$SiOF$_7$)$_{0.998}$]828.1·[(C$_3$H$_6$SiO)$_{0.002}$}$^H$1.6

Calculated, %: C 39.60; Si 9.24; F 43.89; CH$_2$=CH 0.06.

The resulting fluorosiloxane rubber has the properties similar to those described in Example 10.

What is claimed is:

1. Fluorosiloxane rubber of the formula:

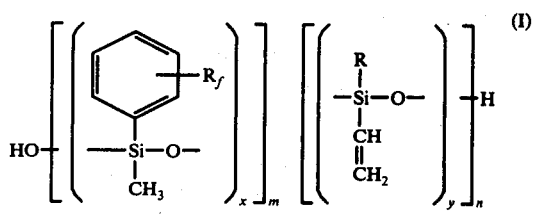

wherein:
R$_F$ = OCF$_3$, OC$_2$F$_5$, OC$_2$F$_4$OCF$_3$, C$_2$F$_4$OCF$_3$, C$_3$F$_7$,
R = CH$_3$, C$_6$H$_5$,
$x$ = 1.0 - 0.97,
$y$ = 0 - 0.03,
$m$ = 370.9 - 1,863.4,
$n$ = 0 - 44.5 and having an average molecular weight ranging from 98,000 to 410,520.

2. A process for producing fluorosiloxane rubbers comprising compounds of the formula:

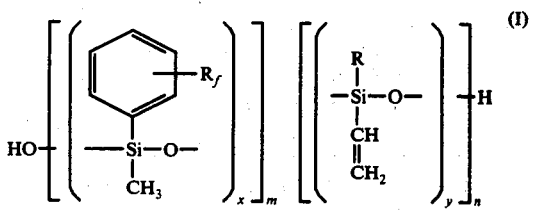

wherein:
R$_F$ = OCF$_3$, OC$_2$F$_5$, OC$_2$F$_4$OCF$_3$, C$_2$F$_4$OCF$_3$, C$_3$F$_7$;
R = CH$_3$, C$_6$H$_5$,
$x$ = 1.0 - 0.97,
$y$ = 0 - 0.03,
$m$ = 370.9 - 1,863.4,
$n$ = 0 - 44.5 and having an average molecular weight ranging from 98,000 to 410,250 involving polycondensation of fluorosiloxane-diols of the formula:

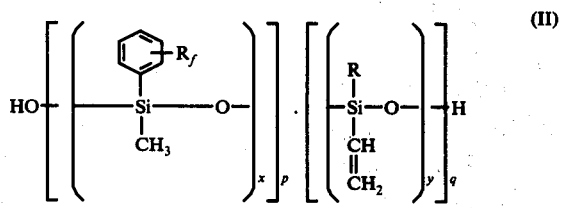

wherein:
R$_F$ = OCF$_3$, OC$_2$F$_5$, OC$_2$F$_4$OCF$_3$, C$_2$F$_4$OCF$_3$, C$_3$F$_7$,
R = CH$_3$, C$_6$H$_5$,
$x$ = 1.0 - 0.97,
$y$ = 0 - 0.03,
$p$ = 2.3 - 187.2,
$q$ = 0 - 3.8 having an average molecular weight ranging from 620 to 51,200; said polycondensation process is conducted at a temperature within the range of from 80° to 150° C in the presence of a catalyst selected from the group consisting of a basic catalyst and a catalyst comprising a complex salt of trifluoroacetic acid and piperidine.

3. A process as claimed in claim 2, wherein said polycondensation is conducted in vacuum under a residual pressure ranging from 2 to 10 mm Hg.

* * * * *